United States Patent [19]
Wu

[11] Patent Number: 4,608,191
[45] Date of Patent: Aug. 26, 1986

[54] COMPOSITION AND METHOD FOR CORROSION INHIBITION

[75] Inventor: Yulin Wu, Bartlesville, Okla.

[73] Assignee: Phillips Petroleum Company, Bartlesville, Okla.

[21] Appl. No.: 655,797

[22] Filed: Oct. 1, 1984

[51] Int. Cl.$^4$ .............................................. C23F 11/16
[52] U.S. Cl. .................... 252/391; 166/294; 166/902; 252/8.555; 252/395; 252/8.554; 422/7; 422/12
[58] Field of Search .................. 252/395, 8.55 E, 391, 252/8.55 D; 528/109; 523/463; 568/46; 166/244 C, 902; 422/7, 12, 14

[56] References Cited

U.S. PATENT DOCUMENTS

| | | | |
|---|---|---|---|
| 2,831,830 | 4/1958 | Schroeder | 528/109 |
| 2,935,488 | 5/1960 | Phillips | 260/45.4 |
| 2,989,485 | 6/1961 | Ellers | 252/151 |
| 3,462,496 | 8/1969 | Fletcher | 260/609 |
| 3,728,240 | 4/1973 | Lard | 204/159.16 |
| 3,828,100 | 8/1974 | Hickner | 260/609 D |
| 3,834,902 | 9/1974 | Wright | 96/1.8 |
| 3,839,494 | 10/1974 | Hickner | 260/830 TW |
| 3,903,048 | 9/1975 | Lombardi | 260/47 EN |
| 4,029,621 | 6/1977 | Hartman | 260/29.2 |
| 4,031,023 | 6/1977 | Musser et al. | 252/406 X |
| 4,072,523 | 2/1978 | Pollet | 96/22 |
| 4,072,526 | 2/1978 | Sels | 96/66.3 |
| 4,201,585 | 5/1980 | Pollet | 430/376 |
| 4,297,255 | 10/1981 | Schenck | 260/18 PF |

FOREIGN PATENT DOCUMENTS 2082589 3/1982 United Kingdom ................ 523/463

OTHER PUBLICATIONS

Marx, Chem. Ab. 87: 40843c (1977); Binding Agent Containing Sulfonium for Aqueous Stoving Lacquer.
Kempter, Chem. Ab. 89: 199207p (1978) Lacquer Binding Agent for Cathodic Electroimmersion Finishing.
Schenck, Chem. Ab. 93: 222009u (1980), Addition Product and its Use as a Cationic Binder in Electrodip Coating.
Aarna, Chem. Ab. 92:61378a, Inhibition of Coke Formation and Metal Corrosion in the Pyrolysis of Hydrocarbon Mixtures.

Primary Examiner—Herbert B. Guynn

[57] ABSTRACT

A composition is provided which, when applied to a metal surface, forms a corrosion-inhibiting film thereon. The composition comprises the reaction product of a first component selected from an epoxy resin, an epoxidized alkene and a substrate having at least one displaceable halogen, and a second component comprising a monomercaptan in a hydrocarbon diluent. The composition is applied by contacting the metal surface with the composition. The composition is particularly useful in the treatment of down-well metal surfaces in oil and gas wells to inhibit the corrosion of the metal under highly corrosive conditions, and is effective even in the presence of polymeric permeability control agents such as aqueous polyacrylamides.

13 Claims, No Drawings

COMPOSITION AND METHOD FOR CORROSION INHIBITION

BACKGROUND

This invention relates to the treatment of metal surfaces to increase their resistance to corrosion. It further relates to compositions which form a corrosion-resistant film on metal surfaces to which they are applied. In a specific embodiment, the invention relates to corrosion-inhibiting treatment of downhole surfaces of oil-drilling equipment. In a further specific embodiment, the invention relates to corrosion-inhibition in oil recovery operations involving the use of polymeric agents.

The problem of corrosion of metal surfaces in contact with air and water is well known. Corrosion and pitting are accelerated in environments in which metal surfaces are in contact with corrosive chemicals such as hydrogen sulfide, carbon dioxide and organic acids, and water having a high electrolyte concentration. Such environments are typical of downwell conditions in oil and gas wells, in which corrosion of metal pipes, pumps and other equipment poses a serious problem requiring monitoring of well sites, frequent maintenance and costly replacement of parts. Oil recovery operations in deep-sea oil fields present these corrosion problems in their most extreme form. The downwell metal surfaces are in contact with large quantities of corrosive chemicals such as dissolved acid gases present in the recovered oil, and the metal surfaces are subjected to temperatures of 90° C. or higher and pressures of 1000 psig or higher, the extreme conditions of temperature and pressure acting to accelerate corrosion and to intensify the problems of applying and maintaining chemical protection for the equipment.

Conventional corrosion-inhibiting agents are often not effective at all under such extreme conditions or reduce corrosion significantly for only a short period of time and then must be reapplied, often at great expense and inconvenience if the well site is not easily accessible or, as in the case of offshore wells, poses difficulties of transporting and applying large volumes of chemicals. In post-primary oil recovery operations involving the use of break-through polymers, severe corrosion on downwell equipment and tubing can result from the incompatibility of some conventional corrosion-inhibiting agents with the break-through polymers.

It has been found that certain chemical agents containing mercaptan groups are effective in inhibiting corrosion. However, the use of effective amounts of such mercaptans poses severe problems of human handling and application because of the intolerable odor of such chemicals.

It is therefore an object of this invention to provide a composition which can be applied to a metal surface to inhibit corrosion and pitting on the metal. It is a further object of the invention to provide a method of treating metal surfaces so as to form a film which inhibits corrosion on the metal even under extreme conditions of temperature and pressure and in highly corrosive environments. It is a further object of the invention to provide a composition and method of treating downwell metal surfaces of oil drilling equipment and tubing. It is a further object to provide a corrosion-inhibiting composition based on a sulfur-containing material which composition is relatively free of characteristic mercaptan odors. It is a further object of the invention to provide a composition and method for treating downwell surfaces of oil drilling equipment and tubing in an oil recovery environment which includes polymeric permeability control agents.

SUMMARY OF THE INVENTION

According to the invention, there is provided a composition which, when applied to a metal surface, forms a corrosion-inhibiting film on the metal surface, the composition comprising the reaction product of a first component selected from a substrate bearing a vicinal epoxide group and a substrate bearing a displaceable halogen, and a second component comprising a monomercaptan, a hydrocarbon diluent for the reaction product and, optionally, an alcohol. In one embodiment, the invention composition comprises the product of reacting the first component with the second component so as to effect essentially quantitative conversion of the mercaptan groups to beta-hydroxythioethers or beta-alkoxythioethers and essentially quantitative displacement of any halogens present in the first component. The reaction will preferably be carried out in a solvent comprising an aromatic hydrocarbon and, optionally, a low molecular weight alcohol. In one embodiment, the invention composition will further contain a quaternary salt adjuvant.

The composition is an effective and durable corrosion inhibitor in highly corrosive environments and in the presence of polymeric permeability control agents such as polyacrylamides.

DETAILED DESCRIPTION OF THE INVENTION

The first component of the invention composition is selected from epoxide-bearing substrates and active halogen-bearing substrates.

Suitable substrates bearing vicinal epoxide groups include any polymeric or nonpolymeric epoxy compound having, on the average, one or more vicinal epoxy groups per molecule. The epoxy compound may be saturated or unsaturated, aliphatic, cycloaliphatic, aromatic or heterocyclic, and may contain substituents which do not materially interfere with the preparation of the final product.

Suitable polymeric substrates bearing vicinal epoxide groups include any epoxy resin having an average of one or more vicinal epoxy groups per molecule. These substrates preferably contain on the average two vicinal epoxy groups per molecule. The preferred epoxide-bearing substrates are epoxy resins exemplified by the polyglycidyl ethers of polyphenols such as the epichlorohydrin copolymers of Bisphenol A. Such epoxy resins can be prepared in accordance with equation I below wherein n is greater than zero, commonly in the range of 0.05 to 10, preferably 0.1 to 2.

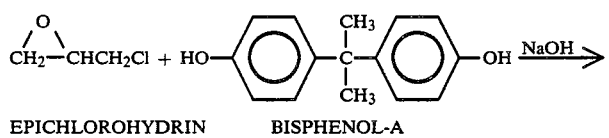

(I)

-continued

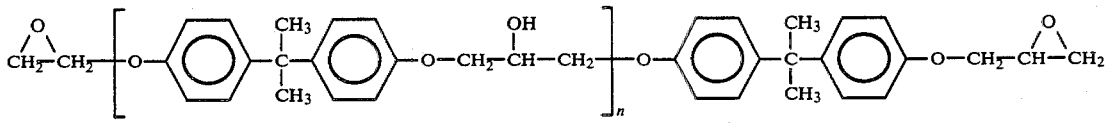

Other suitable epoxy resins can be prepared by the reaction of epichlorohydrin with mononuclear di- and tri-hydroxy phenolic compounds such as resorcinol and phloroglucinol, selected polynuclear polyhydroxy phenolic compounds such as bis(p-hydroxyphenyl)methane and 4,4'-dihydroxy biphenyl, or aliphatic polyols such as 1,4-butanediol and glycerol.

Epoxy resins suitable for use in the invention have molecular weights generally within the range of 50 to about 10,000, preferably about 200 to about 1500. The commercially available Epon ® 828 epoxy resin, a reaction product of epichlorohydrin and 2,2-bis(4-hydroxyphenyl)propane (Bisphenol A) and having a molecular weight of about 400, an epoxide equivalent (ASTM D-1652) of about 185-192, and an n value in structure I above of about 0.2, is presently preferred because of its availability and effectiveness.

Nonpolymeric epoxy-containing substrates suitable for use in the present invention include the epoxidized derivatives of natural oils such as the triesters of glycerol with mixed long-chain saturated and unsaturated acids which contain, e.g., 16, 18 and 20 carbon atoms. Such natural oils are represented by formula II:

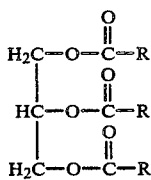

(II)

wherein R represents alkyl and/or alkenyl groups containing 15 to 19 carbon atoms with the proviso that epoxidation of such oils yields a polyepoxide having more than one vicinal epoxy group per molecule of epoxidized oil. Soybean oil is a typical trigyceride which can be converted to a polyepoxide suitable for use in the instant invention.

Other nonpolymeric vicinal epoxides suitable for use in the present invention are derived from esters of polycarboxylic acids such as maleic acid, terephthalic acid, oxalic acid, succinic acid, azelaic acid, malonic acid, tartaric acid, adipic acid and the like with unsaturated alcohols as described by formula III:

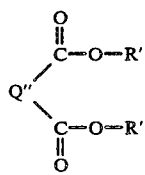

(III)

wherein Q" represents a valence bond, or the following groupings: 1,2-phenylene, 1,4-phenylene, methylene, dimethylene, trimethylene, tetramethylene, pentamethylene, hexamethylene, heptamethylene, vinylene, 1,2-cyclohexylene, 1,4-cyclohexylene, 1,2-ethylenediol and the like, and R' represents alkylene and branched alkylene groups containing 4 to 14 carbon atoms. Representative epoxidized esters derived from materials described by structure (III) include the following:
di(2,3-epoxybutyl)tetrahydrophthalate, di(2,3-epoxyoctyl)oxalate,
di(2,3-epoxyisobutyl)adipate, di(3,4-epoxypentyl)succinate,
di(4,5-epoxydodecyl)terephthalate, di(3,4-epoxyhexyl)phthalate,
di(2,3-epoxybutyl)tartrate, di(7,8-epoxytetradecyl)adipate,
di(3,4-epoxybutyl)glutarate, di(2,3-epoxyhexyl)pimelate,
di(3,4-epoxyoctyl)suberate, di(4,5-epoxydecyl)azelate,
di(2,3-epoxyisohexyl)tetrahydroterephthalate and the like.

In addition to the foregoing, it is contemplated that suitable polyepoxides can be derived from esters prepared from unsaturated alcohols and unsaturated carboxylic acids described by formula IV:

(IV)

wherein R" represents alkenyl and cycloalkenyl groups containing 4 to 12 carbon atoms and R'" represents alkenyl and cycloalkenyl groups containing 4 to 12 carbon atoms. Representative epoxidized esters include the following: 2,3-epoxypentyl 3,4-epoxybutyrate; 2,3-epoxybutyl 3,4-epoxyhexanoate; 3,4-epoxyoctyl 2,3-epoxycyclohexane carboxylate; 2,3-epoxydodecyl 4,5-epoxyoctanoate; 2,3-epoxyisobutyl 4,5-epoxydodecanoate; 2,3-epoxycycldodecyl 3,4-epoxypentanoate; 3,4-epoxyoctyl 2,3-epoxycyclododecane carboxylate and the like.

Other unsaturated materials which can be epoxidized to give resins suitable for use in the instant process include butadiene based polymers such as butadiene-styrene copolymers, polyesters available as derivatives of polyols such as ethylene glycol with unsaturated acid anhydrides such as maleic anhydride, and esters of unsaturated polycarboxylic acids. Representative polyepoxides derived from the latter include the following: dimethyl 3,4,7,8-diepoxydecanedioate; dibutyl 3,4,5,6-diepoxycyclohexane-1,2-dicarboxylate; dioctyl 3,4,7,8-diepoxyhexadecanedioate; diethyl 5,6,9,10-diepoxytetradecanedioate and the like.

Dimers of dienes such as 4-vinylcyclohexene-1 from butadiene and dicyclopentadiene from cyclopentadiene can be converted to epoxidized derivatives which are suitable for the invention.

In addition, other suitable polyepoxides are described by formula V:

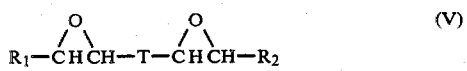

(V)

wherein T represents a valence bond, linear or branched alkylene, cycloalkylene, arylene, alkyleneoxyalkylene, alkyleneoxy alkyleneoxyalkylene, alkyleneoxycycloalkyleneoxyalkylene, alkyleneoxyaryleneoxyalkylene, alkyleneoxyarylenealkylenearyleneoxyalkylene, and $R_1$ and $R_2$ represent hydrogen or alkyl groups containing 1 to 3 carbon atoms with the proviso that the polyepoxides contain 4 to 24 carbon atoms.

Representative nonpolymeric vicinal epoxides suitable for use in the instant process include: the diglycidyl ethers of Bisphenol A; 1,4-bis(2,3-epoxypropoxy)butane; diglycidyl ether; 1,4-bis(2,3-epoxypropoxy)benzene; 1,2,5,6-diepoxyhexane; ethylene glycol diglycidyl ether; 1,3-bis(2,3-epoxypropoxy)propane; 1,4-bis(2,3-epoxypropoxy)cyclohexane; 1,3-bis(2,3-epoxypropoxy)benzene; 1,4-bis(epoxyethyl)benzene; 1,4-bis(epoxyethyl)cyclohexane; 1,2,6,7-diepoxydecane; 1,2,9,10-diepoxydecane; 1,2,7,8-diepoxyoctane; 1,2,6,7-diepoxyheptane; 1,2,8,9-diepoxynonane, 1,2,13,14-diepoxytetradecane, and the like.

It is further contemplated that various monoepoxides can be used in the instant process. Suitable monoepoxides are described by formula (VI):

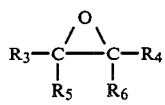
(VI)

wherein the groups $R_3$, $R_4$, $R_5$ and $R_6$ represent hydrogen, aryl, aralkyl, alkaryl, alkyl, hydroxyalkyl, cycloalkyl, cycloalkylene, with the total number of carbon atoms in said compounds varying over the range of 2 to 16. Any two of said R groups can collectively represent divalent alkylene radicals to form 5 and 6 membered rings bearing the epoxide moiety. Representative monoepoxides suitable for use in the present process include: ethylene oxide; propylene oxide; glycidol, 1,2-epoxyhexane; styrene oxide; 3-p-tolyl 1,2-epoxypropane; 4,5-epoxyoctane; 1-cyclohexyl-1,2-epoxybutane; 3-phenyl-1,2-epoxypropane; 1,2-diphenyl ethylene oxide; 1,2-epoxycyclohexane; 1,4-dicyclohexyl-2,3-epoxybutane; 1,2-epoxycyclopentane, and the like.

The first constituent can alternatively be a substrate bearing a displaceable halogen. Suitable polymeric substrates bearing displaceable halogen are exemplified by the polyepihalohydrins such as polyepichlorohydrin and polyepibromohydrin. It is preferable that 100 mol percent of the pendant halogen groups be displaced because of the inherent corrosive nature of the halogen moiety. Preferably, beta-mercaptoethanol (BME) is reacted with polyepichlorohydrin to yield a corrosion-inhibiting composition with the pendant thioether groupings:

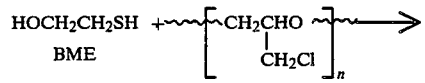

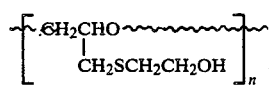

(as sodium mercaptide) polyepichlorohydrin

Thioglycerine reacts similarly with polyepichlorohydrin as follows:

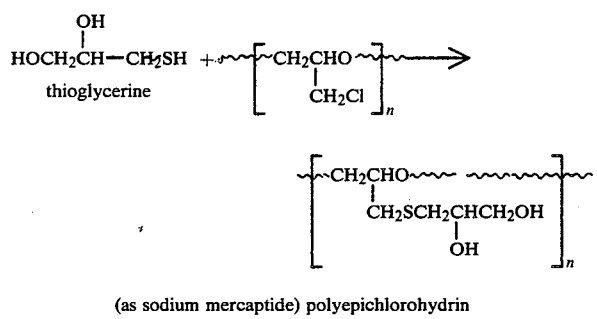

(as sodium mercaptide) polyepichlorohydrin

It is contemplated that mixtures of the monomercaptans can be used to give corrosion-inhibitors bearing different beta-hydroxythioether groupings.

Suitable nonpolymeric substrates bearing displaceable halogen are exemplified by haloethers, haloalcohols or halothioethers such as bis(2-chloroethyl)ether, 3-chloro-1,2-propanediol, and bis(2-chloroethyl)thioether. The reaction of these materials with beta-mercaptoethanol takes place as follows:

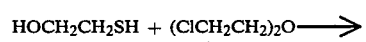

Reaction with the thioether analog would be expected to go as follows:

The above products contain the desirable thioether moieties, preferably beta to at least one hydroxyl function. An additional nonpolymeric substrate with displaceable halogen is exemplified by halomethylated aromatics such as bis(1,4-chloromethyl)benzene which would react with thioglycerine as follows:

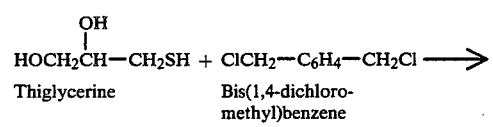

Thiglycerine    Bis(1,4-dichloromethyl)benzene

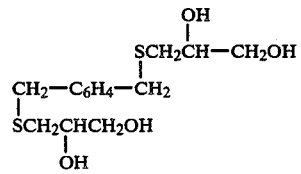

Suitable monomercaptans containing 2 to 8 carbons are described by the formula R—SH, wherein R can be aryl, aralkyl, alkyl, cycloalkyl, hydroxyalkyl, dihydroxyalkyl, cyanoalkyl, sulfoalkyl, alkoxycarbonylalkylene, alkoxyalkylene, alkylthioalkylene as well as various heterocyclic groupings such as benzoxazolyl, benzoxazolylalkylene, 1-alkyl imidazolyl, and N-pyrrolidonylalkylene and the like.

Specific monomercaptans suitable for use in the present process include beta-mercaptoethanol, thiophenol, alpha-mercaptotoluene, propyl mercaptan, 3-mercaptopropionitrile, ethyl mercaptoacetate, betaethylthioethyl mercaptan, beta-propoxyethyl mercaptan, cyclohexanethiol, 3-mercapto-1,2-propanediol, 2-mercaptobenzoxazole, 2-mercapto-1-methyl imidazole, N-(2-mercaptoethyl)-2-pyrrolidone, 2-mercaptoethanesulfonic acid, 1-mercapto-2-methyl-2-butanol, 1-mercapto-2-propanol, 2-mercapto-1-propanol, 1-mercapto-3-propoxypropane, 1-mercapto-3-(methylthio)propane and the like. The presently preferred monomercaptan is beta-mercaptoethanol (BME) because of its availability and effectiveness.

Alcohols suitable for use in the invention include any alkanols containing at least one —OH functional group. These include alcohols containing 1 to about 15 carbon atoms such as methanol, ethanol, 1-propanol, 2-propanol, butanols, pentanols, hexanols, heptanols, octanols, 1-pentadecanol, and mixtures of these. Polyols containing 2 to 5 carbon atoms such as ethylene glycol, 1,3-propanediol; 2,3-butanediol, glycerol and pentaerythritol can also be used. Presently, methanol is preferred because of the effectiveness of the resulting corrosion inhibiting system.

A diluent is generally used for the reaction of the first component with the second component and as the medium for application of the invention composition. Examples of diluents suitable for use in the treating agents include aromatic hydrocarbons such as the isomeric xylenes, toluene, benzene, naphtha, cyclohexylbenzene, fuel oil, diesel oil, heavy aromatic oils, Stoddard solvent, crude oil, and condensate from gas wells. Presently, xylene is the preferred hydrocarbon diluent because it is an effective solvent for the other preferred components and because of the corrosion-inhibiting effectiveness of the resulting composition.

The higher-boiling aromatic hydrocarbons are preferred for deeper wells with higher downhole temperatures and in high-temperature gas and oil wells generally.

In some treatment methods, discussed below, it is advantageous to employ a carrier liquid or drive fluid to force a slug of the corrosion-inhibiting composition down into the well being treated. Any of the hydrocarbons listed above as suitable diluents may be used. For practical and economic reasons, diesel oil, sea water or condensate from the well being treated are preferred carrier fluids.

Various alcohol-aromatic hydrocarbon azeotropes can be used as the reaction medium and diluent. Representative azeotropes include the following, with the weight percent of each component in parenthesis: methanol (39.1)/benzene (60.9); ethanol (32)/benzene (68); 2-propanol (33.3)/benzene (66.7); 1-propanol (16.9)/benzene (83.1); isobutyl alcohol (9.3)/benzene (90.7); 1-butanol (68)/p-xylene (32); 2-pentanol (28)/toluene (72) and hexanol (13)/p-xylene (87). It is also contemplated that impure alcohol streams such as mixed butanols resulting from oxo technology using propylene feedstock can be used in the treating compositions.

In one embodiment, the invention composition further contains a quaternary salt adjuvant. Quaternary salt adjuvants include, for example, quaternized polyethoxylated amines and quaternary ammonium salts of alkenyl succinates.

In general, quaternary ammonium salts suitable for use in the instant invention are described by formula V:

$$(R_1)(R_2)(R_3)(R_4)N^+X^- \qquad V$$

wherein $R_1$, $R_2$, $R_3$, and $R_4$ may be the same or different alkyl, alkenyl and aralkyl moieties containing individually in the range of 1 to 18 carbon atoms, with the conditions that the total number of carbon atoms does not exceed 40 and at least one of the groups contains at least 7 carbon atoms.

In formula (V), $X^-$ represents a halide ion such as chloride, bromide, or iodide as well as other acid-derived anions such as acetate, hydrogen sulfate, and dihydrogen phosphate. The chloride salts are currently preferred on the basis of availability and cost. The representative Arquad ® compositions are available from Armak Chemicals Division of Akzona Inc. of Chicago, Ill. Additional quaternary ammonium adjuvants denoted herein as CTHAB and CTHAL represent, respectively, hexadecyltrimethylammonium bromide and hexadecyltrimethylammonium chloride.

Representative quaternary ammonium salt adjuvants for use in the composition can be derived from naturally-occurring materials such as soybean oil, tallow, coconut oil and the like. These materials contain 1 to 3 methyl groups with one or more long-chain aliphatic groupings. The tallow-derived compositions possess primarily (on the average) saturated and unsaturated $C_{16}$ and $C_{18}$ radicals as the so-called long-chain aliphatic groupings. The coconut oil-derived compositions possess long-chain aliphatic radicals containing from about 10 to about 18 carbon atoms. A representative analysis of such materials shows about 5 percent $C_{10}$ radicals, about 55 percent $C_{12}$ radicals, about 15 percent isopropanol and about 15 percent water. The so-called "dodecyl" alkyl moiety in Arquad ® C-50, which reportedly contains by weight about 50% cocotrimethylammonium chloride, about 1% sodium chloride, about 36% isopropanol and about 13% water. The "coco" moiety in Arquad ® C-50 comprises about 8% octyl, about 9% decyl, about 47% dodecyl, about 18% tetradecyl, about 8% hexadecyl, about 5% octadecyl and about 5% octadecenyl. Additional quaternary ammonium salt adjuvants include a 1:1 mixture of trimethyl tallow ammonium chloride and dimethyl dicoco ammonium chloride (Arquad ® T-2C-50), dimethyl dicoco ammonium chloride (Arquad ® S-50), trimethyl octadecyl ammonium chloride (Arquad ® 18-50), trimethyl coco ammonium chloride (Arquad ® C-50; further containing isopropyl alcohol), trimethyl coco ammonium chloride (aqueous solution) (Arquad ® C-33; this product contains no isopropanol), and dimethylalkylbenzylammonium chloride (Arquad ® B-100).

The components of the corrosion-inhibiting system can be mixed in any order, but it is presently preferred to prepare the beta-hydroxythioether in a hydrocarbon-alcohol mixture and add to this solution a mixture containing the hydrocarbon and the onium salt adjuvant optionally with additional alcohol. The alcohol may be added separately or as a component in a commercially available aqueous alcohol solution of the onium salt adjuvant used as received.

The corrosion inhibiting composition will generally contain about 1 to 30 weight percent, based on the weight of the total composition, of the quaternary ammonium salt, preferably about 5 to 20 weight percent.

The components of the corrosion inhibitor can be combined in any fashion which permits the reaction of the epoxide or halogen groups of the first component with the mercaptan groups of the second component. The compositions will generally be prepared by mixing the two components so as to promote complete reaction in solvent blends of the diluent and the alcohol at a temperature in the range of about 20° C. to about 180° C., preferably about 25° C. to about 100° C.

The components can be combined in any amount desired, including amounts in which the equivalent ratio of the first component to the second component is within the range of about 0.5:1 to about 11:1, generally about 0.8:1 to about 3:1 but for actual field use the first component will generally be present in the reaction mixture in an amount of about 0.8 to about 1.4 equivalents per equivalent of the second component. The preferred compositions are prepared by essentially stoichiometric reaction of monomercaptans with the first component in solvent blends comprising aromatic hydrocarbons and low molecular weight alcohols. In practice, to obtain essentially stoichiometric reaction, the first component can be used in an amount of about 1 to about 20 percent above that required by the stoichiometry. Thus, the equivalent weight of first component to monomercaptan is preferably at least about 1:1 and is desirably in the range of 1:1 to 1.2:1.

Suitable methods for preparing the corrosion inhibitor in its diluent are as follows, described in terms of the preferred embodiment of the composition. A solution is prepared by mixing chemically equivalent amounts of EPON® 828 and beta-mercaptoethanol in a 1:1 weight/weight mixture of xylene and methanol. The solution is stirred at ambient temperature to ensure thorough mixing of the components and is then stored at ambient temperature for about 48 hours. Alternatively, the solution is refluxed at about 68° C. for 7 hours to complete the reaction between the reactive groups. The reaction product will not have a mercaptan odor and the reaction mass can be stored in drums.

For some applications, it will be important to attain essentially complete conversion of the mercaptan groups to beta-hydroxythioethers so that the reaction product mass does not have the distinctive odor of mercaptan groups. Furthermore, it is desirable, in the case in which one of the reactants is a reactive halogen-containing substrate, that the halogens be quantitatively displaced by the mercaptan groups because of the corrosiveness of the halogen. In order to prevent the mercaptan odor, the equivalent ratio of epoxide or displaceable halogen to mercaptan is preferably at least about 1:1.

Any remaining trace odors of mercaptan present in the reaction mass can be removed by post-treatment of the composition, for example by mixing in agents such as low molecular weight epoxides such as glycidol to "cap off" remaining mercaptan groups. Up to about 5 percent equivalent excess (10 percent molar excess) of epoxide groups over mercaptan groups can be used with no expected significant decrease in the corrosion-inhibiting effectiveness of the composition.

The reaction of the first component with the second component may produce a product which is only slightly soluble in brine or crude oil. As a result, the corrosion inhibitor has a tendency to separate from the solvent and settles in the gas or oil well being treated. The addition of an ethoxylated amine such as, for example, polyethoxylated cocoamine, is added to the solution. Such a co-solvent can be added in any amount effective for increasing the solubility of the reaction product in its solvent, generally about 5 to about 50, preferably about 10 to about 25 weight percent, based on the weight of the total composition.

The composition is useful for protecting metal surfaces, particularly surfaces of objects made from iron and steel. It is particularly useful for treating metal surfaces such as metal pipes and casings in oil, gas and geothermal wells, which are subjected to high temperatures and pressures and corrosive chemical agents.

Down-well treatments with the corrosion-inhibiting compositions can be effected by a variety of methods depending upon the particular chemical and physical characteristics of the well being treated. When treating metal surfaces, particularly in down-well applications, the corrosion-inhibiting composition can be applied as one solution containing a beta-hydroxythioether, or alternatively, it can be applied by contacting the metal surfaces sequentially with a solution of the mercaptan component and a solution of the epoxy or halogenated component to produce a corrosion-inhibiting beta-hydroxythioether in situ.

Batch Treatment. The corrosion inhibitor is introduced preferably in an oil carrier into the annulus of a cased wellbore between the casing and the tubing. The well is returned to production and the injected compositions are gradually returned with the produced fluids, effecting en route the coating of contacted metal surfaces with a corrosion-resistant film. Alternatively in this method, a liquid column of the treating agent can be placed in the tubing or the annular space and allowed to stand for a time which can range from 10 minutes to 24 hours before resuming production, usually at least 2 hours.

Extended Batch Treatment. The corrosion inhibitor is injected into the annular space of a cased wellbore, the well is closed off, and the composition is continuously circulated with well fluids down the annulus and up the tubing for an extended period of time which can vary widely but will usually be between 2 and 48 hours, depending on the depth of the well. At the end of the determined time period, the well is returned to production.

Squeeze Treatment. The corrosion inhibitor is injected down a cased wellbore penetrating a subterranean formation and is forced into the formation against formation pressure with high-pressure pumps. The composition can be injected within a gelled or dispersed polymer matrix based, for example, on polyacrylamides, biopolysaccharides, or cellulose ethers. After the pressure is released, the treating agent is slowly produced back with the recovered fluids, resulting in the application of a corrosion-resistant film on metal surfaces contacted by the treating agent as it flows to the surface. This method is particularly suitable in high-pressure gas or oil wells.

Spearhead Treatment. A highly concentrated slug of the corrosion inhibitor is injected into the tubing of a cased borehole and pressured down the tubing with a fluid column of diesel, produced gas, nitrogen and a brine solution such as 2 weight percent aqueous potassium chloride. When the pressure is released, the fluid column and the excess corrosion-inhibiting composition are produced by the tubing. The composition as a concentrated slug thus contacts the metal walls of the tubing and lays down a protective film as it flows in a downward and upward circuit.

Continuous Treatment. A solution of the corrosion-inhibiting agent, e.g., a solution of a beta-hydroxythioether in a mixed alcohol/aromatic hydrocarbon, is continuously injected into the annulus of a cased borehole and produced by the tubing. The volume of injected fluid is regulated to any desired volume per unit time by the use of conventional pumping procedures.

Metal surfaces can also be protected by dipping or spraying the surfaces with the invention compositions and then allowing excess fluid to drain from the treated surfaces at ambient conditions.

When applying the composition to the metal tubing of, for example, a gas or oil well, it is not necessary to pre-treat metal surfaces with oil or other substances prior to applying the invention composition, and the treated surfaces may or may not have an oil coating prior to the application.

An advantage of the invention corrosion inhibitor, in addition to its effectiveness in highly corrosive environments, is its durability in the presence of aqueous polyacrylamides (see Example III) conventionally used in oilfield applications. In addition, the composition has been found to be an effective biocide toward sulfate-reducing bacteria (see Example X).

EXAMPLE I

This example describes the preferred procedure for preparing a beta-hydroxythioether corrosion inhibitor.

The procedure for preparing the corrosion inhibitor is as follows: Chemically-equivalent amounts of EPON® 828 and beta-mercaptoethanol are dissolved in a 1:1 weight/weight mixture of xylene and methanol. This solution is stirred at ambient temperature to ensure thorough mixing of all components and is then stored at ambient temperature for about 55 hours. Alternatively, the solution is refluxed at about 68° C. for 7 hours to complete the reaction between the mercaptan and epoxide groups. The reaction product possesses a sweet odor rather than a mercaptan odor. The entire reaction mass can be stored in drums until used in the field. The molar ratio of epoxy resin to mercaptoalcohol in the procedure is about 0.5:1 (1 equivalent of epoxide per-equivalent of mercaptan).

The course of the reaction used to prepare the corrosion inhibitor can be followed by infrared (IR) spectral analysis. The IR peak due to the presence of the —SH group in the mercaptan reactant becomes less intense and essentially disappears as the thioether is formed. The inventive inhibitor can be prepared by blending chemicals and allowing them to set for 3 to 5 days at ambient conditions or by refluxing the reactants at about 68° C. for seven hours. In either method the reaction product mass possesses essentially none of the unpleasant mercaptan odor. Based on correlation with the infrared spectral data, the formation rate of the corrosion inhibitor is estimated below.

| Reaction Time (Hr.) | Percent Conversion of Mercaptan Groups to beta-Thioether Groups |
|---|---|
| Formation Rate of Thioether at 21° C. | |
| 0 | 0 |
| 0.25 | 7 |
| 23 | 19 |
| 31 | 22 |
| 47 | 97 |
| 52 | 98 |
| 55 | 100 |
| 124 | 100 |
| Formation Rate of beta-Thioether at 68° C. | |
| 0 | 0 |
| 1 | 21 |
| 2 | 42 |
| 3 | 69 |
| 4 | 77 |
| 5 | 96 |
| 6 | 97 |
| 7 | 100 |

EXAMPLE II

A series of laboratory corrosion inhibition tests was carried out in 1-liter Erlenmeyer flasks equipped with magnetic stirring bars, under laboratory conditions designed to simulate corrosive oil-water environments encountered in field drilling sites. A charge of 50 mL of NBU crude oil and 950 mL of a synthetic brine was used in each run along with the corrosion inhibitor. A slow stream of carbon dioxide was bubbled through the solution during each test to maintain the mixture near saturation with $CO_2$ at ambient conditions. The rate of corrosion and pitting index were determined using a CORRATOR® monitoring system available from Rohrback Instruments. A carbon steel probe was suspended in the stirred oil-water mixture maintained at about 49° C. during each run.

A control run (run No. 1 in Table I) using beta-mercapto-ethanol was carried out and compared to duplicate inventive runs (runs 2 and 3 in Table I) using the reaction product of beta-mercaptoethanol and EPON® 828 prepared in a mixture of xylene and methanol. Preparation of the inventive composition was as described in Example I.

In run No. 1, 0.1 mL of beta-mercaptoethanol was used with 50 mL North Burbank Unit (NBU) crude oil and 950 mL of synthetic NBU brine. In runs 2 and 3, 0.2 mL aliquots of the inventive mercaptoethanol-/EPON® 828 reaction mass in solvent were used with 50 mL NBU crude oil and 950 mL of NBU synthetic brine. In order to test the relative durability of the protective films laid down by the control system and the inventive system, the oil and brine in the test vessels were replaced with fresh oil and brine after about 20 hours, and then the oil-brine test medium was replaced with fresh brine after about 94 hours. The test was terminated after about 116 hours. The results are summarized in Table I.

TABLE I

| | FILM DURABILITY TESTS (120F) | | | |
|---|---|---|---|---|
| Elapsed Time (Hours) | Run 1 Control C.R.[a]/P.I.[b] | Run 2 Invention C.R.[a]/P.I.[b] | Run 3 Invention C.R.[a]/P.I.[b] | Remarks |
| Initial Reading | 0.01/0.04 | 0.01/0.15 | 0.52/0.03 | |
| 2.25 | 0.02/0.08 | 0.02/0.08 | 0.01/0.05 | |
| 3.25 | 0.03/0.07 | 0.03/0.07 | 0.01/0.03 | |
| 5 | 0.01/0.04 | 0.01/0.07 | 0.02/0.04 | |
| 20 | 0.01/0.15 | 0.01/0.02 | 0.01/0.01 | * |
| 23 | 0.02/0.12 | 0.01/0.04 | 0/01/0.05 | |
| 24 | 0.02/0.10 | 0.01/0.09 | 0.01/0.04 | |
| 27.5 | 0.02/0.07 | 0.01/0.06 | 0.01/0.08 | |
| 94 | 0.01/0.03 | 0.01/0.01 | 0.01/0.04 | ** |

TABLE I-continued

| | FILM DURABILITY TESTS (120F) | | | |
|---|---|---|---|---|
| Elapsed Time (Hours) | Run 1 Control C.R.$^a$/P.I.$^b$ | Run 2 Invention C.R.$^a$/P.I.$^b$ | Run 3 Invention C.R.$^a$/P.I.$^b$ | Remarks |
| 95 | 17/37 | 0.26/0.44 | 1.7/5.3 | |
| 96 | 27/16 | 0.37/0.25 | 2.5/0.2 | |
| 98 | 24/21 | 0.24/0.12 | 3.7/2 | |
| 99 | 19/5 | 0.31/0.11 | 3.5/1.4 | |
| 101 | 15/3 | 0.31/0.21 | 3.1/0.6 | |
| 116 | 7.2/0.6 | 2.1/1.2 | 2.4/0.1 | |

$^a$C.R. represents Corrosion Rate (expressed in mils per year, mpy).
$^b$P.I. represents Pitting Index.
*After about 20 hours, the oil and brine medium was replaced with fresh oil and brine.
**After about 94 hours, the oil and brine medium was replaced with fresh brine.

Referring to the test time interval of zero to 20 hours, it is evident that the control run No. 1 (beta-mercaptoethanol) is comparable in performance (see C.R./P.I. values) to the inventive runs 2 and 3 (reaction product of EPON ® 828 and beta-mercaptoethanol). After the replacement of the oil and brine in all the test vessels at approximately 20 hours, the C.R. and P.I. values for the three runs remained comparable (see time interval of 20 to 94 hours).

Referring to the test interval of 95 to 116 hours after replacing the oil and brine with fresh brine, the C.R. and P.I. values in control run 1 exhibited a significant increase whereas these values in runs 2 and 3 remained relatively low. This replacement of oil and brine with fresh brine alone (at about 94 hours of testing) is a severe test and the lower C.R. and P.I. values for the inventive runs demonstrate the superior film durability of the inventive system.

EXAMPLE III

This example demonstrates the effectiveness of the beta-hydroxythioether corrosion inhibitor system even in the presence of polymeric viscosifiers such as polyacrylamide. The inventive composition was prepared in a 50/50 wt/wt solvent blend of xylene and methanol. A foul-smelling beta-mercaptoethanol and EPON ® 828 were present in a molar ratio of 2:1 (1 equivalent of mercaptan for each equivalent of epoxide) and the mixture was heated at reflux for a period of 24 hours. Aliquots of the pleasant-smelling reaction product mixture were used in the corrosion tests. The laboratory tests were carried out with a CORRATOR ® as described in Example II and the results are summarized in Table II.

TABLE II

| Corrosion Testing in the Presence of Polyacrylamide | | | |
|---|---|---|---|
| Test Period (Hours) | Corrosion Rate (mpy) | Pitting Index | Remarks |
| 0.25 | 0.01 | 0.04 | |
| 4.25 | 0.01 | 0.02 | After 4.25 hours, a |
| 4.33 | 0.9 | 1.30 | sample of polyacrylamide |
| 5.1 | 0.7 | 0.20 | was added to the test system |
| 5.6 | 0.63 | 0.09 | After 5.6 hours, the system |
| 7.9 | 0.39 | 0.12 | was retreated with the |
| 23 | 0.06 | 0.01 | inventive inhibitor |
| 24.75 | 0.01 | 0.01 | After 23 hours, the probe |
| 27.50 | 0.10 | 0.30 | was immersed in another |
| 30.75 | 0.56 | 0.08 | fresh sample of and brine |
| 45.50 | 0.07 | 0.03 | |
| 49 | 4.9 | 1.4 | After 45.5 hours, the probe |
| 54 | 3.6 | 0.3 | was immersed in another fresh sample of brine |
| 69.25 | 2.8 | 0.2 | |

Referring to the results in Table II, it is apparent that the inventive composition reduced the corrosion rate to the low value of 0.01 in a very short time. Contacting the coated probe with polyacrylamide resulted in a small increase in corrosion rate (up to 0.9) which was reduced to 0.06 by retreatment with the inventive composition.

At this point (about 24 hours), the coated probe was contacted with another fresh sample of oil and brine and the corrosion rate over a 20 hour span did not exceed 0.56 and was 0.07 after an additional 20 hours of testing.

The final stage of testing was the most severe, as the coated probe was immersed in brine. Over an additonal 20 hours of testing, the maximum corrosion rate increased to 4.9 but then gradually decreased to a final recorded value of 2.8 mpy. These results indicate the superior effectiveness of the instant composition compared to fatty amine corrosion inhibitors, which are known to be readily stripped from metal surfaces on being contacted with aqueous polyacrylamide.

EXAMPLE IV

This example describes the preparation of beta-hydroxythioethers by the thermal condensation of beta-mercaptoethanol (BME) and Epon ® 828 (an epoxy resin). The materials were prepared by refluxing mixtures of xylene, methanol, Epon ® 828 and BME under a nitrogen blanket for approximately 7 hours in conventional laboratory glassware. Four batches of material were prepared at successively higher molar ratios of resin to mercaptoethanol in order to establish the effect of increasing levels of resin on the composition's effectiveness as a corrosion inhibitor. The preparative runs are summarized in Table III.

TABLE III

| Preparation* of Beta-Hydroxythioether Corrosion Inhibitors | | | | |
|---|---|---|---|---|
| Run No. | BME (g)$^a$ | Resin (g)$^b$ | Xylene (g) | Methanol (g) | Molar Ratio Resin/BME |
| 1 | 3.90 | 10 | 10 | 10 | 0.5$^c$ |
| 2 | 1.95 | 10 | 10 | 10 | 1.0$^d$ |
| 3 | 0.975 | 10 | 10 | 10 | 2.0$^d$ |
| 4 | 0.488 | 10 | 10 | 10 | 4.0$^d$ |

*Each reaction mixture contained Epon ® 828, xylene and methanol in a 1:1:1 wt/wt/wt ratio.
$^a$BME represents beta-mercaptoethanol (formula weight 78)
$^b$The resin used in each run was Epon ® 828 (formula weight 400)
$^c$This molar ratio corresponds to an equivalent ratio of 1:1, i.e., 1 equivalent of Epon ® 828 to 1 equivalent of BME.
$^d$Runs 2, 3 and 4 contain "excess" resin, i.e., each run contained an equivalent ratio of resin/BME of greater than 1:1. The equivalent ratio of resin/BME in runs 2, 3 and 4, respectively, was 2:1, 4:1 and 8:1.

EXAMPLE V

This example gives corrosion inhibitor test results for the materials prepared in Example IV. Aliquots of the entire reaction mass were used. The results are summarized in Table IV.

TABLE IV

| Corrosion Test* Results With Beta-Hydroxythioethers | | | | |
|---|---|---|---|---|
| Run No. | Volume of Inhibitor (mL) Product$^a$ | BME$^c$ (mg) | Resin (mg) | Molar Ratio Resin/BME | Corrosion Rate$^b$ (mils per year) |
| 5 | 0.2 | 21.6 | 54.8 | 0.5 | 1.2 |
| 6 | 0.4 | 22.7 | 116.0 | 1 | 1.8 |
| 7 | 0.73 | 21.2 | 218.0 | 2 | 1.5 |

TABLE IV-continued

| | Corrosion Test* Results With Beta-Hydroxythioethers | | | | |
|---|---|---|---|---|---|
| Run No. | Volume of Inhibitor (mL) Product[a] | BME[c] (mg) | Resin (mg) | Molar Ratio Resin/ BME | Corrosion Rate[b] (mils per year) |
| 8 | 1.44 | 21.1 | 433.0 | 4 | 1.3 |

*The experiments were carried out in the presence of 50 mL NBU crude oil and 950 mL NBU synthetic brine at 49° C. under a small stream of $CO_2$. An aliquot of a commercially available polyacrylamide stock solution added to give 50 ppm of polyacrylamide in each test solution.
[a]These volumes of samples refer to the reaction masses prepared in Example IV (runs 1, 2, 3 and 4) comprising xylene, methanol, and beta-hydroxythioether. Runs 2, 3 and 4, of course, also contain "excess" epoxy resin. All of the BME became chemically combined in each run as evidenced by the disappearance of any mercaptan odor.
[b]These corrosion rates are the average of the results from duplicate runs.
[c]These numbers represent the mg of chemically combined BME in the sample. There is essentially no free BME in any of the samples.

Referring to the results in Table IV, it is evident that the corrosion rates of runs 5, 6, 7 and 8 are comparable even though runs 6, 7, and 8 contained "excess" epoxy resin. These results indicate that the presence of "excess" epoxy resin, i.e., greater than 1:1 equivalent ratio of resin to BME, does not significantly enhance the corrosion inhibiting effectiveness of the formulation.

EXAMPLE VI

This example gives additional corrosion inhibitor test results for the materials prepared in Example IV. These results are summarized in Table V.

TABLE V

| | Corrosion Test* Results With Beta-Hydroxythioethers | | | | | |
|---|---|---|---|---|---|---|
| Run No. | Volume of Inhibitor (mL) Product[a] | BME[c] (mg) | Resin (mg) | Molar Ratio Resin/ BME | Deposit on Probe (mg) | Corrosion Rate[b] (mils per year) |
| 9 | 0.2 | 21.6 | 54.8 | 0.5 | 30 | 0.7 |
| 10 | 0.22 | 12.5 | 64.0 | 1.0 | 35 | 0.7 |
| 11 | 0.23 | 6.7 | 69.0 | 2.0 | 70 | 1.1 |
| 12 | 0.24 | 3.52 | 72.0 | 4.0 | 95 | 3.0 |

*See footnote * in Table IV.
[a,b,c]See footnotes [a,b,c] in Table IV.

Referring to the results in Table V, corrosion rate increased as the amount of "chemically combined" beta-mercaptoethanol(beta-hydroxythioether) decreased. The total amount of "chemically-combined" BME and resin was approximately constant (about 76 mg) in runs 9, 10, 11 and 12. This observation indicates that the "chemically-combined" BME species is the likely active inhibitor. Presumably, the deposit on the probe increases as the excess epoxy resin increases successively in runs 9, 10, 11 and 12 which in field applications could lead to "gunk" formation.

EXAMPLE VII

This example describes the preparation and testing of a corrosion-inhibiting composition comprising the product resulting from the reaction of n-butyl glycidyl ether and beta-mercaptoethanol in a mixture of xylene and methanol.

A charge of 2.28 g (17.5 mmoles) of n-butyl glycidyl ether, 1.56 g (20 mmoles) of beta-mercaptoethanol and 3.84 g of a 1:1 wt/wt mixture of xylene and methanol was placed in a 25 mL round-bottomed flask fitted with a water-cooled reflux condenser, and the mixture was boiled for about 48 hours under a nitrogen atmosphere. The cooled reaction mixture was essentially free of any mercaptan-like odor. Presumably, the course of the reaction was as follows:

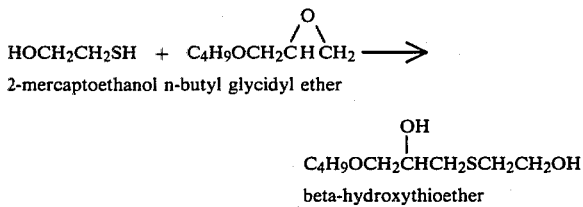

$$C_4H_9OCH_2CHCH_2SCH_2CH_2OH$$
$$\phantom{C_4H_9OCH_2C}|\phantom{HCH_2SCH_2CH_2OH}$$
$$\phantom{C_4H_9OCH_2C}OH$$

beta-hydroxythioether

Corrosion tests were carried out on the reaction mass in the same manner as described above. Duplicate samples were tested and the results are summarized in Table VI. The CORRATOR ® test runs involved the use of 0.2 mL aliquots of the reaction mass, 50 mL NBU crude oil and 950 mL of NBU brine.

TABLE VI

| Corrosion Inhibitor Derived from Beta-Mercaptoethanol and n-Butyl Glycidyl Ether | | |
|---|---|---|
| Elapsed Time Hours | Run 1 C.R.[a]/P.I.[b] | Run 2 C.R.[a]/P.I.[b] |
| 2.17 | 0.01/0.04 | 0.01/0.04 |
| 3.66 | 0.01/0.02 | 0.01/0.02 |
| 4.66 | 0.01/0.01 | 0.01/0.01 |
| 5.66 | 0.01/0.01 | 0.01/0.01 |
| 21.17 | 0.01/0.01 | 0.01/0.0 |
| 26.17 | 0.01/0.01 | 0.01/0.0 |

[a]C.R. represents Corrosion Rate (mpy).
[b]P.I. represents Pitting Index.

Referring to the results in Table VI (duplicate samples in runs 1 and 2), it is evident that the reaction mass resulting from the chemical reaction of beta-mercaptoethanol and n-butyl glycidyl ether is an effective corrosion inhibitor. This example demonstrates that an effective inhibitor can be prepared by reacting essentially equivalent amounts of monomercaptan with the non-polymeric monoepoxide. Preferably, equivalent amounts of monoepoxide and monomercaptan are desired. However, a slight excess of monoepoxide can be used with no detrimental effects.

EXAMPLE VIII

This field test example demonstrates the corrosion-inhibiting effectiveness of the reaction mass resulting from the reaction of beta-mercaptoethanol and EPON ® 828 in a mixture of xylene and methanol. The field test was carried out in a polymerflooded area in which the formation water contained significant levels of polyacrylamide. Weight loss of metal coupons was the basis for determining the corrosion rate in mils per year (mpy). The field test results are summarized in Table VII. Nine wells were tested and the corrosion inhibitor was metered in continuously during the test period. The inventive inhibitor was continuously injected into the wells at the average of about 6 quarts per day.

TABLE VII

| Field Test Results on Hydroxythioether Corrosion Inhibitor System | | | | | |
|---|---|---|---|---|---|
| Well | Initial Corrosion# Rate (mpy) | Period I[a] (mpy) | Period II[b] (mpy) | Period III[c] (mpy) | Period IV[d] (mpy) |
| 1 | 23.7 | 39.5 | 26.2 | 8.0 | 2.1 |
| 2 | 135.2 | 31.9 | 29.3 | 14.4 | 5.2 |
| 3 | 2.4 | 3.8 | 1.4 | 1.0 | 2.4 |
| 4 | 7.0 | 16.2 | NR* | 21.0 | 8.5 |

TABLE VII-continued

Field Test Results on Hydroxythioether Corrosion Inhibitor System

| Well | Initial Corrosion# Rate (mpy) | Period I[a] (mpy) | Period II[b] (mpy) | Period III[c] (mpy) | Period IV[d] (mpy) |
|------|------|------|------|------|------|
| 5 | 2.3 | 4.6 | 3.2 | 2.5 | 2.5 |
| 6 | 42.8 | 5.0 | 3.3 | 2.7 | 3.0 |
| 7 | NR* | NR* | 1.5 | 1.0 | 2.8 |
| 8 | 6.7 | NR* | NR* | 7.4 | 6.4 |
| 9 | 3.0 | NR* | NR* | 0.6 | 2.0 |

These corrosion rates (mpy) were exhibited by wells being continuously treated with commercially available corrosion inhibitors before injecting the inventive inhibitor.
*NR represents "Not Recorded".
[a]The corrosion rate values (mpy) in this column were determined after 37 days of treating the designated well continuously with the beta-hydroxythioether corrosion inhibitor system.
[b]Same basis as in footnote a except for a time period of 72 days.
[c]Same basis as in footnotes a and b except for a time period of 96 days.
[d]Same basis as in footnotes a, b and c except for a time period of 123 days.

Referring to the results in Table VII, it is evident that the inventive corrosion inhibitor composition was comparable or superior in performance to the comparison commercial inhibitors. Compare, for example, the magnitude of the corrosion rates under the "Initial Corrosion Rate" heading and the corrosion rates under the heading "Period IV" for the individual wells. In general, four coupons were positioned in each test well and then removed for weighing at time intervals of 37, 72, 96 and 123 days. Entries 3, 4, 5 and 8 in Table VII demonstrate that, of the comparison inhibitors in those wells, were comparable in effectiveness to the inventive composition (comparing corrosion rates, respectively, under the headings "Initial Corrosion Rate" and "Period IV"). Entries 1, 2 and 6 in Table VII demonstrate the dramatic superiority of the inventive composition over the comparison inhibitor (comparing corrosion rates under "Initial Corrosion Rate" and "Period IV").

EXAMPLE IX

This example describes laboratory test results using the reaction product of beta-mercaptoethanol-/EPON ® 828 as a corrosion inhibitor in an aqueous medium containing polyacrylamide. Control runs with commercially available corrosion inhibitors designated hereinbelow as "A" and "B" were also carried out in the CORRATOR ® apparatus.

Test solutions initially contained 50 mL NBU crude oil, 950 mL synthetic NBU water and 50 ppm polyacrylamide. Sufficient quantities of inhibitors were added as solutions to give 50 ppm (by volume) levels of "inhibitors" based on volumes of inhibitor solutions added to the test solution. For example, a 0.05 mL aliquot of a commercially available corrosion inhibitor solution added to 1000 mL of test solution gives a "50 ppm level" of said inhibitor solution in the test mixture. Results on duplicate samples are summarized in Table VIII.

TABLE VIII

Beta-Hydroxythioether Corrosion Inhibitor System in Presence of Polyacrylamide

| Elapsed (Hours) | Invention* Sample 1 | Invention* Sample 2 | Control* "A" | Control* "A" | Control* "B" | Control* "B" |
|------|------|------|------|------|------|------|
| 1.5 | 90[a] | 80[a] | 100[b] | 80[b] | 70[b] | 65[b] |
| 2.5 | 26 | 16 | 70 | 46 | 60 | 56 |
| 3.5 | 11 | 5.1 | 58 | 39 | 46 | 49 |
| 4.5 | 9.2 | 4.0 | 51 | 35 | 49 | 52 |
| 5.5 | 7.2 | 3.4 | 45 | 31 | 48 | 52 |
| 6 | 6.0 | 3.0 | 40 | 28 | 46 | 48 |
| 7.5 | 5.4 | 2.9 | 37 | 26 | 45 | 46 |
| 25.5[c] | 2.0 | 1.8 | 5.6 | 8.0 | 22 | 18 |
| 26.5[d] | 1.7 | 1.6 | 4.4 | 6.5 | 16 | 13 |
| 46.5 | 0.96 | 0.89 | 1.4 | 2.2 | 4.1 | 4.2 |

*Corrosion rates are given in mils per year (mpy).
[a]To obtain a "50 ppm level" of inhibitor solution in the test mixture, a 0.05 mL aliquot of the inhibitor solution was added to the test mixture. The inhibitor solution is the total reaction mass resulting from reacting equivalent quantities of EPON ® 828 and beta-mercaptoethanol in a 1:1 wt/wt mixture of xylene and methanol wherein the total weight of the charged reactants is equal to one-third of the total reaction mass.
[b]Aliquots of 0.05 mL of commercial inhibitors "A" and "B" were added to the test solution to give "50 ppm levels" of the respective inhibitor solutions in the test mixture.
[c,d]Sufficient quantities of a polyacrylamide stock solution were added to double and triple the original 50 ppm level of polyacrylamide in the initial test solution.

Referring to the corrosion rate results in Table VIII, it is seen that the invention inhibitor lowered the corrosion rate more rapidly and to lower ultimate values than did the commercial inhibitors "A" and "B". It is also noteworthy that the corrosion rate for the invention systems continued to decrease even after the addition of more polyacrylamide at the 25.5 hour and 26.5 hour time intervals in the test procedure.

EXAMPLE X

This example demonstrates the biocidal activity of the reaction product of beta-mercaptoethanol and EPON ® prepared in a xylene/methanol mixture. A 200 ppm concentration of the adduct solution in methanol was effective against sulfate-reducing bacteria. The methanol solution was prepared by adding a sufficient amount of a stock solution of product in 1:1 xylene/methanol to methanol to give a 200 ppm (by volume) level of corrosion inhibitor solution in methanol.

Control tests with methanol and the reaction product of an amine and an epoxy resin proved ineffective toward sulfate-reducing bacteria. The amine/epoxy resin corrosion inhibitor was prepared by contacting aliquot quantities of EPON ® 828 and DUOMEEN ® T in a xylene/methanol (1:1 wt/wt) mixture and then contacting the mixture with carbon dioxide. The methanol test solution of the amine/epoxy corrosion inhibitor system was prepared by adding a sufficient amount of a stock solution of inhibitor in 1:1 xylene/methanol to methanol to give a 200 ppm (by volume) level of corrosion inhibitor solution in methanol. Results are summarized in Table IX.

TABLE IX

Beta-Hydroxythioether Corrosion Inhibitor System As SRB (Sulfate Reducing Bacteria) Biocide

| Test Structure | 24 Hours Contact Time | 1 Week Contact Time |
|------|------|------|
| Beta-Hydroxythioether Corrosion Inhibitor System | Effective[a] | Effective[a] |
| Amine/Epoxy Resin (CO$_2$-Treated) Corrosion Inhibitor System | Not Effective[b] | Not Effective[b] |

TABLE IX-continued

Beta-Hydroxythioether Corrosion Inhibitor System As SRB (Sulfate Reducing Bacteria) Biocide

| Test Structure | 24 Hours Contact Time | 1 Week Contact Time |
|---|---|---|
| Methanol | Not Effective[b] | Not Effective[b] |

[a]Corrosion inhibitors were injected into serum bottles of synthetic NBU brine with 1 mL of active SRB culture. The solutions were incubated at 86° F. for 24 hours and/or one week. Then 0.1 mL of the solution was injected into a SRB growth medium and incubated at 86 F. for 28 days or until the solution turned black due to reaction of $H_2S$ from SRB metabolism with the iron present in solution.
[a]Solution did not turn black, indicating that $H_2S$ (from SRB metabolism) was not present, suggesting the biocidal capability of the beta-hydroxythioether system.
[b]Methanol and the nitrogen-containing inhibitor were ineffective against SRB, as evidence by the precipitation of iron sulfide (black).

Referring to the results in Table IX, it is evident that the sulfur-containing corrosion inhibitor (first entry) exhibited biocidal activity toward sulfate-reducing bacteria. The second and third entries of Table IX indicate the ineffectiveness, respectively, of the nitrogen-containing corrosion inhibitor and methanol toward sulfate-reducing bacteria. In view of these results, it can be inferred that the protective film of the beta-hydroxythioether corrosion inhibition system would not be subject to degeneration by SRB attack and therefore would provide corrosion inhibition over a longer period of time than an inhibitor film which was not biocidal toward sulfate-reducing bacteria.

EXAMPLE XI

This example describes corrosion inhibitor laboratory test results using a beta-hydroxythioether and a quaternized polyethoxylated amine.

The beta-hydroxythioether used in this example resulted from the stoichiometric reaction of Epon ® 828 and beta-mercaptoethanol in a mixture of xylene and methanol. The reaction was carried out so that the beta-hydroxythioether inhibitor solution was the total reaction mass resulting from the reaction of equivalent quantities of Epon ® 828 and beta-mercaptoethanol in a 1:1 wt/wt mixture of xylene and methanol wherein the total weight of the charged reactants was equal to one-third of the total reaction mass.

The quaternary salt adjuvant was a commercially available polyethoxylated quaternary ammonium salt sold under the trademark Ethoquad ® C/25. This material is 95% active methylpolyoxyethylene(15)cocoammonium chloride and is commercially available as a clear liquid.

Laboratory corrosion inhibitor tests were carried out in 1-liter Erlenmeyer flasks. The corrosion inhibitor to be tested was added to 50 mL of NBU crude oil and this mixture was transferred to a 1-liter Erlenmeyer flask containing 950 mL of NBU brine. A slow stream of $CO_2$ was passed through the oil-water system to maintain a slight positive pressure of carbon dioxide. For the runs summarized in Table X the oil-water mixture was stirred continuously with a magnetic bar. The rate of corrosion in terms of mils per year (mpy) was determined using a Corrator ® monitoring system available from Rohrback Instruments. A carbon steel probe was suspended in the oil-water mixture maintained at approximately 49° C. during each run.

BHTE represents beta-hydroxythioether produced by the reaction of equivalent quantities of Epon ® 828 and beta-mercaptoethanol in a 1:1 wt/wt mixture of xylene and methanol wherein the combined weights of Epon ® 828 and beta-mercaptoethanol amounted to one-third of the total reaction mass. One part by weight of this reaction mass was combined with one part of methanol to form the BHTE solution used in the corrosion tests.

C/25 represents Ethoquad ® C/25, which is a 95% active commercial material of methylpolyoxyethylene(15)cocoammonium chloride (a quaternary salt). Appropriate amounts of (C/25)/methanol stock solutions were used in the corrosion tests.

BHTE/(C/25) represents a mixture of the beta-hydroxythioether (see above) and the ¼ (C/25)/methanol stock solution of (b). One part of the reaction mass containing the beta-hydroxythioether in (a) was combined with one part of the ¼ (C/25)/methanol stock solution of (b) for use in the corrosion tests.

Results of the corrosion tests are summarized in Table X.

The levels of inhibitor in the corrosion tests are defined as follows, based on a 1000 mL volume of test mixture containing about 50 mL NBU crude oil and about 950 mL of NBU brine, e.g., 0.01 mL inhibitor solution→10 ppm inhibitor solution level in test mixture 0.025 mL inhibitor solution→25 ppm inhibitor solution level in test mixture 0.05 mL inhibitor solution→50 ppm inhibitor solution level in test mixture

TABLE X

Corrosion Inhibition With Mixture of Beta-Hydroxythioether and Quaternary Salt

| Run No. | Inhibitor Sol'n Level (ppm) | Inhibitor Used | Corrosion Rate (mpy) | | | | | | | |
|---|---|---|---|---|---|---|---|---|---|---|
| | | | 1 Hr. | 2 Hr. | 3 Hr. | 4 Hr. | 5 Hr. | 6 Hr. | 12 Hr. | 18 Hr. |
| 1 | 25 | BHTE[a] | 65.8 | 59 | 35 | 17 | 11 | 8.41 | 3.2 | 2.9 |
| 2 | 25 | C/25[b] | 83 | 106.5 | 98 | 87 | 73 | 63.5 | 24 | 10 |
| 3 | 25 | BHTE/(C-25)[c] | 4.7 | 5.2 | 2.3 | 1.0 | 1.3 | 1.3 | 0.47 | 0.26 |
| 4 | 50 | BHTE/(C-25) | 10.7 | 4.1 | 1.7 | 0.6 | 0.2 | 0.1 | 0.04 | 0.01 |
| 4a | 50 | BHTE/(C-25) | NR* | 16.8 | 7.1 | 2.3 | 1.7 | 1.1 | 0.67 | 0.48 |

*NR represents "Not Recorded"
[a]BHTE represents a beta-hydroxythioether solution as described above.
[b]C/25 represents a methylpolyoxyethylene(15)cocammonium chloride solution in methanol as described hereinabove.
[c]BHTE/(C-25) represents a mixture of beta-hydroxythioether and quaternary salt as described hereinabove.

Referring to the results in Table X, the BHTE/(C-25) inventive composition at 25 ppm (run 3) gave lower corrosion rates in a shorter time (see 4-hour results) than did either the BHTE system (run 1) or the C-25 system (run 2). At the higher level of 50 ppm for the BHTE/(C-25) system (see duplicate runs 4 and 4a), the improvement is also apparent. These runs demonstrate that the effectiveness of the beta-hydroxythioether system for corrosion inhibition is enhanced by the inclusion of the quaternary salt adjuvant.

EXAMPLE XII

This example describes corrosion inhibitor laboratory test results using the beta-hydroxythioether described in Example XI mixed with polyoxyethylene(15)cocoamine (an amine) and trimethylcocoammonium chloride (50% active) (quaternary salt). A stock solution for corrosion testing was prepared by mixing the following three components:

(a) 20 mL BHTE (beta-hydroxythioether solution resulting from the reaction of Epon® 828 and beta-mercaptoethanol in 1:1 wt/wt mixture of xylene and methanol).

(b) 10 mL Ethomeen® C/25 (a commercially available polyoxyethylene(15)cocoamine).

(c) 10 mL Arquad® C-50 (a 50% active commercially available trimethylcocoammonium chloride quaternary salt in aqueous isopropanol).

Laboratory corrosion inhibitor tests were carried out with the three-component stock solution to demonstrate its effectiveness in the presence or absence of polyacrylamide. The results of these tests are summarized in Table XI.

TABLE XI

Corrosion Inhibition With Mixture of beta-hydroxythioether, Polyethoxylated Amine and Quaternary Salt

| Run No. | Inhibitor Sol'n Level (ppm) | Inhibitor Used | Initial | Corrosion Rate (mpy) 5.17 Hr. | 6.17 Hr. | 28.17 Hr. | PAM* Present |
|---|---|---|---|---|---|---|---|
| 1 | 50 | B/PA/QS$^a$ | 9.0 | 1.6 | 1.4 | 0.9 | Yes |
| 2 | 50 | B/PA/QS$^a$ | 6.0 | 1.2 | 1.0 | 0.6 | Yes |
| 3 | 200 | B/PA/QS$^a$ | 17 | 1.3 | 1.2 | 0.63 | Yes |
| 4 | 200 | B/PA/QS$^a$ | 27 | 1.3 | 1.2 | 0.5 | Yes |
| 5 | 50 | B/PA/QS$^a$ | 0.01 | 0.01 | 0.01 | 0.01 | No |
| 6 | 50 | B/PA/QS$^a$ | 0.16 | 0.45 | 0.04 | 0.85 | No |

$^a$B/PA/WS represents the above defined stock solution of beta-hydroxythioether, Ethomeen® C/25 and Arquad® C-50.
*PAM represents polyacrylamide present at a level of 1000 ppm in runs 1, 2, 3, 4 but not present in runs 5 and 6.

Referring to duplicate runs 5 and 6 in Table XI, the beta-hydroxythioether-polyethoxylated amine-quaternized amine lowered the corrosion rate almost immediately to an average value of <0.5 mpy. Duplicate runs 1, 2 and 3, 4 at 50 and 200 ppm levels, respectively, required somewhat longer times (on the order of 5–6 hours) to lower the corrosion rate to values of less than 1.5 mpy in systems containing about 1000 ppm polyacrylamide. All of the systems in Table XI exhibited corrosion rates of less than 1 mpy even after 28 hours of testing.

It is noteworthy that the corrosion inhibitor system was effective in the presence of polyacrylamide, since polyacrylamides on contacting nitrogen-based corrosion-resistant films often remove the films, necessitating frequent retreatment.

EXAMPLE XIII

This example describes corrosion inhibitor laboratory test using different levels of a 1:1 wt/wt solution of BHTE and Ethoquad C/25 wherein (a) BHTE and (b) Ethoquad® C/25 represent, respectively, (a) beta-hydroxythioether solution produced by the reaction of equivalent quantities of Epon® 828 and beta-mercaptoethanol in a 1:1 wt/wt mixture of xylene and methanol wherein the combined weights of Epon® 828 and beta-mercaptoethanol amounted to one-third of the total reaction mass and (b) a 95% active commercially available methylpolyoxyethylene(15)cocoammonium chloride (a quaternized polyoxyethylene(15)cocoamine). The 1:1 wt/wt test solution of BHTE and Ethoquad® C/25 is designated BHTE/EQ.

The corrosion test levels of inhibitor solution at 10 ppm, 25 ppm and 50 ppm were formulated by adding, respectively, 0.01 mL, 0.025 mL and 0.05 mL of the 1:1 wt/wt BHTE/Ethoquad C/25 stock solution to a 1000 mL volume of test mixture containing about 50 mL NBU crude oil and about 950 mL of NBU brine. Results are summarized in Table XII.

TABLE XII

Corrosion Inhibition With Mixture of beta-Hydroxythioether and Quaternary Salt

| Run No. | Inhibitor Sol'n Level (ppm) | Inhibitor Used | Initial | 2 hr. | 4 Hr. | 6 Hr. | 14 Hr. |
|---|---|---|---|---|---|---|---|
| 1 | 10 | BHTE/EQ | 0.01 | 0.01 | 0.11 | 0.21 | 0.01 |
| 2 | 10 | BHTE/EQ | 0.01 | 0.03 | 0.01 | 0.01 | 0.01 |
| 3 | 25 | BHTE/EQ | 0.01 | 0.01 | 0.01 | 0.01 | 0.01 |
| 4 | 25 | BHTE/EQ | 0.01 | 0.01 | 0.01 | 0.01 | 0.01 |
| 5 | 50 | BHTE/EQ | 0.01 | 0.36 | 0.33 | 0.13 | 0.05 |

Referring to the results in Table XII, the beta-hydroxythioether/quaternary salt system (BHTE/EQ) lowered the corrosion rate almost immediately to an average value of less than 0.10 mpy. The corrosion rates were maintained at very low levels even after 14 hours of testing. The system was very effective even at 10 ppm (runs 1 and 2).

EXAMPLE XIV

This example demonstrates that a quaternary salt adjuvant such as a quaternary ammonium salt of a long chain alkenyl succinate enhances the corrosion inhibiting effectiveness of a beta-hydroxythioether.

The corrosion inhibitor tests were carried out in essentially the same manner as described above. The beta-hydroxythioether was produced by the reaction of equivalent quantities of Epon® 828 and beta-mercaptoethanol in a 1:1 wt/wt mixture of xylene and methanol in which the combined weights of Epon® 828 and beta-mercaptoethanol amounted to one-third of the total reaction mass. Samples of the reaction mass solution were used in the tests.

The tests employed a mixture of a commercially available corrosion inhibitor (ASQ), which is a quaternary salt of an alkenyl succinate, with the beta-hydroxythioether (BHTE) solution. The mixture contained 90 volume percent of the BHTE solution and 10 volume percent of the ASQ solution.

The corrosion test level for the BHTE solution was 200 ppm based on the volume percent of added BHTE solution to the total test mixture of 1000 mL, i.e., 50 mL NBU crude oil and about 950 mL of NBU brine. A 0.2 mL aliquot was used in order to obtain the 200 ppm concentration level. Similarly, in testing the BHTE-/ASQ mixture, a 0.2 mL aliquot was used in order to obtain a 180 ppm level of the BHTE solution and 20 ppm level of the commercial solution of ASQ (a quaternary salt of an alkenyl succinate). The results of the corrosion tests are summarized in Table XIII.

TABLE XIII

Corrosion Inhibition With a Mixture of Beta-Hydroxythioether and Quaternary Salt

| Run No. | Inhibitor Sol'n Level (ppm) | Inhibitor Used | Initial | CORROSION RATES (mpy) Test Period (Hrs.) | | | | | | | | | | | |
|---|---|---|---|---|---|---|---|---|---|---|---|---|---|---|---|
| | | | | 0.25 | 3.83 | 3.91 | 4.0 | 4.25 | 4.33 | 5.0 | 5.1 | 23 | 45.75 | 46 | 47 |
| 1 | 200 | BHTE | NR* | 0.01 | NR | NR | NR | 0.01$^a$ | 0.9 | NR | 0.7 | NR | NR | NR | NR |
| 2 | 200** | BHTE/ASQ | 0.01 | NR | 0.01$^a$ | 0.01 | 0.01 | NR | NR | 0.01 | NR | NR | NR | NR | NR |
| 3 | 100 | ASQ | NR | NR | NR | NR | 0.1 | NR | NR | NR | NR | 0.1 | 0.1$^a$ | 0.06 | 0.05 |

*NR represents "not recorded".
**180 ppm BHTE solution and 20 ppm ASQ solution
$^a$A sufficient quantity of a stock aqueous solution of polyacrylamide was added to give a 1000 ppm level in the test mixture immediately after the designated corrosion rate was determined, e.g., at 4.25 hours in run 1, at 3.83 hours in run 2, and at 45.75 hours in run 3.

Referring to the results in runs 1 and 2, the BHTE-/ASQ mixture was more effective than the BHTE solution alone particularly after the addition of 1000 ppm of polyacrylamide stock solution to the test system. The addition of the polyacrylamide caused the corrosion rate in the BHTE test (run 1) to increase from about 0.01 mpy to about 0.7 to 0.9 mpy whereas in the BHTE-/ASQ system (run 2) the corrosion rate remained at about 0.01 mpy even after addition of polyacrylamide.

Run 3 in Table XIII demonstrates the corrosion inhibiting effectiveness of the commercial quaternary salt both before and after the addition of polyacrylamide. It is known that polyacrylamides on contacting nitrogen-based corrosion-resistant films can remove the films, necessitating frequent retreatment.

I claim:

1. A composition which forms a corrosion-inhibiting film when applied to a metal surface, the composition comprising the reaction product of:
   (a) a first component selected from the groups consisting of
      (1) a substrate bearing a vicinal epoxide group, and
      (2) a substrate having at least one displaceable halogen; and
   (b) a second component comprising a monomercaptan containing 2 to 8 carbon atoms and present in an amount such that the equivalent ratio of said first component to said second component is within the range of about 0.5 to about 11.0, wherein the reaction product of the first and second component is a beta hydroxy thioether or a beta alkoxy thioether; and
   (c) a quaternary ammonium salt selected from the group consisting of a quaternized polyethoxylated amines and salts represented by the general formula:

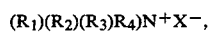

$(R_1)(R_2)(R_3)R_4)N^+X^-$, wherein $R_1$, $R_2$, $R_3$ and $R_4$ are individually selected from the group consisting of alkyl, alkenyl and aralkyl groups containing individually 1 to 18 carbon atoms such that the total number of carbon atoms does not exceed 40 and at least one of the groups contains at least 7 carbon atoms, and wherein $X^-$ is selected from the group consisting of chloride, bromide, iodide, acetate, hydrogen sulfate, dihydrogen phosphate and alkenyl succinate;
   (d) a hydrocarbon diluent; and
   (e) methanol.

2. The composition of claim 1 in which the equivalent ratio of the first component to the second component is about 0.8:1 to about 3:1.

3. The composition of claim 1 which further comprises a polyethoxylated amine present in an amount of about 5 to about 50 weight percent, based on the weight of the compositions.

4. The composition of claim 1 in which the first component is an epoxy resin.

5. The composition of claim 4 in which the monomercaptan is a beta-hydroxyalkyl monomercaptan.

6. The composition of claim 5 in which the hydrocarbon diluent comprises xylene.

7. The composition of claim 5 in which the quaternary ammonium salt is present in an amount of from about 5 to about 20 weight percent, based on the weight of the composition.

8. The composition of claim 1 in which the monomercaptan is beta-mercaptoethanol.

9. The composition of claim 8 in which the first component is selected from substrates having at least one displaceable halogen.

10. The composition of claim 8 in which the equivalent ratio of the first component to the beta-mercaptoethanol is in the range of about 0.8:1 to about 1.4:1.

11. The composition of claim 1 in which the quaternary ammonium salt is present in an amount of from about 1 to about 30 weight percent, based on the weight of the composition.

12. The composition of claim 11 in which the quaternary ammonium salt is a quaternized polyethoxylated amine.

13. The composition of claim 11 in which the quaternary ammonium salt is present in an amount of from about 2 to about 10 weight percent, based on the weight of the composition.

* * * * *